US006801882B1

(12) United States Patent
Fairman

(10) Patent No.: US 6,801,882 B1
(45) Date of Patent: Oct. 5, 2004

(54) METHODS AND SYSTEMS FOR GENERATING PROFILE CURVES OF SOLID MODELS

(75) Inventor: Ruben E. Fairman, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/532,977

(22) Filed: Mar. 22, 2000

(51) Int. Cl.$^7$ .............................................. G06F 17/10
(52) U.S. Cl. ........................ 703/2; 345/420; 385/146
(58) Field of Search .......................... 703/2; 345/420; 175/361; 385/146

(56) References Cited

U.S. PATENT DOCUMENTS

| | | | |
|---|---|---|---|
| 5,524,198 A | | 6/1996 | Matsumoto et al. |
| 5,590,255 A | | 12/1996 | Takeshima et al. |
| 5,680,525 A | | 10/1997 | Sakai et al. |
| 5,745,666 A | * | 4/1998 | Gilley et al. ................ 345/428 |
| 6,039,131 A | * | 3/2000 | Beaton ....................... 175/376 |
| 6,219,444 B1 | * | 4/2001 | Shashua et al. ............. 382/154 |
| 6,268,871 B1 | | 7/2001 | Rice et al. |
| 6,308,144 B1 | * | 10/2001 | Bronfeld et al. ............... 703/2 |

OTHER PUBLICATIONS

Solid Edge User's Guide Version 7, MU28900–ENG, Unigraphics Solutions ™, 1999, pp. 2, and 30–51.*
Inside Pro/Engineer Solutions, Gary Graham et al., Onworld Press, 1999, pp. 76–80.*

* cited by examiner

Primary Examiner—Kevin J. Teska
Assistant Examiner—Ed Garcia-Otero
(74) Attorney, Agent, or Firm—William Scott Andes; Armstrong Teasdale LLP

(57) ABSTRACT

An algorithm programmed into a computer permits the computer to automatically generate a two-dimensional profile curve of an electronically represented three-dimensional solid model without creating separate intersecting planes extending through the three-dimensional solid. The computer is configured to query the three-dimensional solid to identify faces on the three-dimensional solid. The query of the solid begins after a face edge is identified as a seed face and continues from the identified face to each adjacent revolved face circumscribing the solid. As each revolved face is located, a representative curve for the face is created in the two-dimensional plane.

19 Claims, 8 Drawing Sheets

METHODS AND SYSTEMS FOR GENERATING PROFILE CURVES OF SOLID MODELS

BACKGROUND OF THE INVENTION

This invention relates generally to generating profile curves and, more particularly, to systems and methods for generating two-dimensional profile curves of three-dimensional solid models.

Geometric models of components are often created with computer aided design (CAD) programs to enable a user to view a component in a variety of orientations. Often two-dimensional cross-sectional representations of such components are used by various CAD-dependent processes downstream from the CAD program including computer aided engineering (CAE) analysis, computer aided manufacturing (CAM) and drafting. Specifically, with respect to CAB analysis, two-dimensional CAE analysis often provides results comparable to full three-dimensional analysis, but requires less computational intensity and less time than three-dimensional analysis. Furthermore, with respect to CAM operations, tooling-paths are programmed in two-dimensional planes. Accordingly, two-dimensional tooling-paths include only a maximum revolved profile of the component in a two-dimensional plane which is simplified in comparison to a profile of the component in a three-dimensional definition.

Known profile curve generators use a plurality of intersecting planes to create two-dimensional representations of three-dimensional solids. The intersecting planes are extended through the three-dimensional solid at a plurality of angles disposed about an axis of rotation of the three-dimensional solid. Each intersection of the solid produces a set of curves at a given angle relative to the axis of rotation. The different sets of intersecting curves do not create a contiguous profile of the three-dimensional solid, but rather each set of curves is independently rotated into a two-dimensional plane of interest. To graphically reprint a full envelope of the three-dimensional solid, intersecting curves must be extended through the solid at selected angles or potential areas of the solid will not be graphically profiled. Such drafting programs require large amounts of disk storage space to store the numerous intersecting curves. Furthermore, such programs are time-consuming to execute because of the large amount of computations created as a result of the numerous intersections.

BRIEF SUMMARY OF THE INVENTION

In an exemplary embodiment, a two-dimensional profile curve of a computer representation of a three-dimensional solid model is automatically generated. More specifically, and in one embodiment, a two-dimensional representation is created with a computer executing a profile curve generator without creating separate intersection lines that extend through the three-dimensional solid. The profile curve generator queries the three-dimensional solid to identify facts on the three-dimensional solid. The query of the three-dimensional solid begins after a revolved face is identified as a seed face. The query process continues until all the faces have been queried and processing returns to the seed face. As each revolved face is located, internal edge loops disposed within the face are ignored and a representative curve for the face is created in the two-dimensional plane.

The computer executing the algorithm is programmed to terminate the algorithm if a face edge is not identified which satisfies internal constraints programmed within the algorithm. The computer is also programmed to terminate the execution of the algorithm if the curve generated is not continuous. As a result, the algorithm enables the computer to generate contiguous curves and accurate two-dimensional representations of three-dimensional solids in a more cost-efficient and less time-consuming manner in comparison to known profile curve generators.

DETAILED DESCRIPTION OF THE INVENTION

Figure 1:
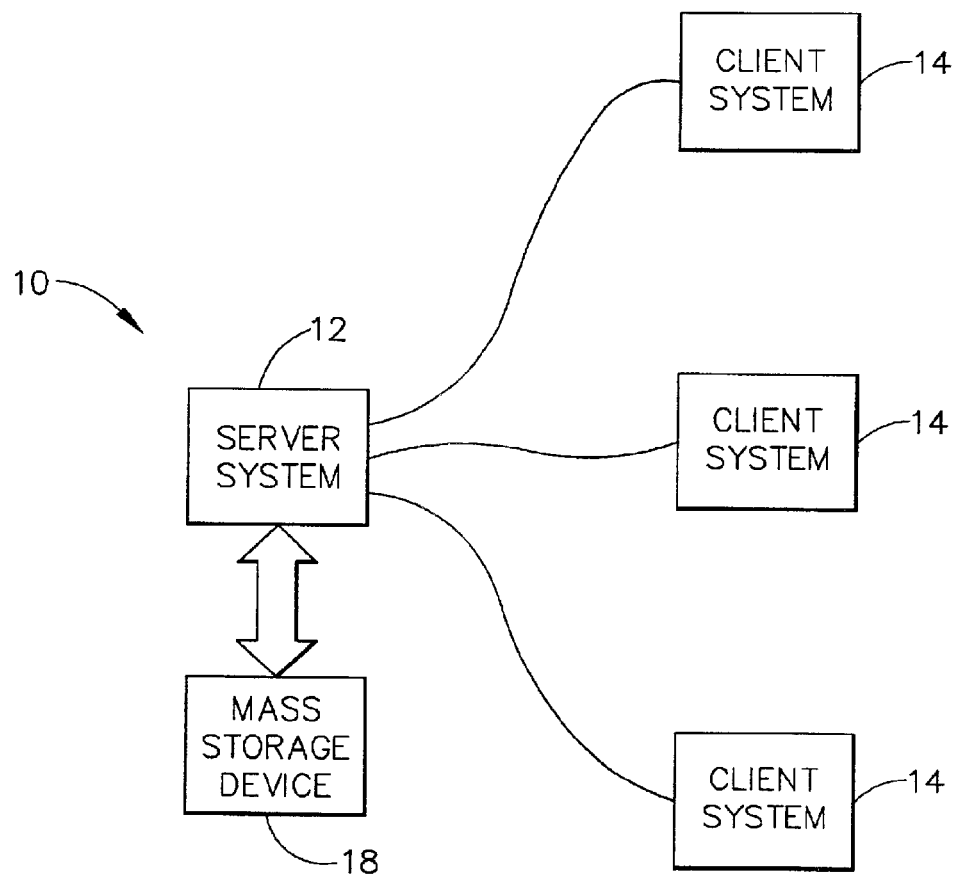
FIG. 1 is a block diagram of a profile curve generator system.

FIG. 1 is block diagram of a profile curve generator system 10 for automatically generating two-dimensional profile curves of three-dimensional solid models. Profile curve generator system 10 includes a server system 12 and a plurality of client systems 14 connected to server system 12. In one embodiment, client system 14 includes a computer (not shown) including a web browser, a central processing unit (CPU), a random access memory (RAM), an output device, for example a monitor, a mass storage device, and an input device, for example a keyboard or a mouse. Server system 12 is accessible to client system 14 via the Internet. Client system 14 is interconnected to the Internet through many interfaces including dial-in-connections, cable modems, special high-speed ISDN lines, and networks, such as local area networks (LANs) or wide area networks (WANs). In one embodiment, client system 14 includes any client system capable of interconnecting to the Internet including a web-based phone or other web-based connectable equipment. Server system 12 is also connected to a mass storage device 18. Mass storage device 18 is accessible by potential users through client system 14.

Figure 2:
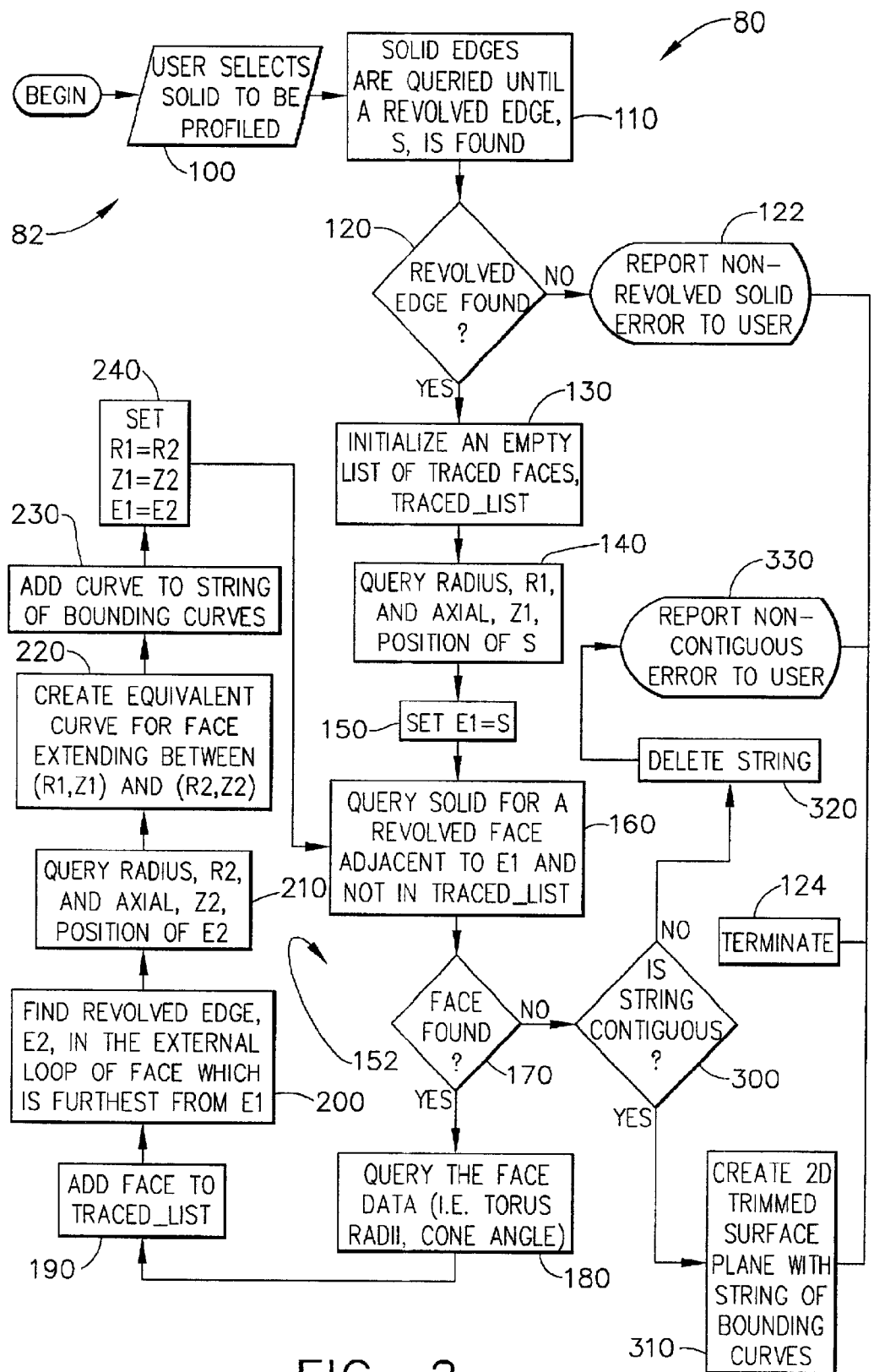
FIG. 2 is a flowchart of an algorithm for use with the profile curve generator system shown in FIG. 1.

FIG. 2 is a flowchart 80 of an algorithm 82 for use with profile curve generator system 10 (shown in FIG. 1). Algorithm 82 is stored in mass storage device 18 (shown in FIG. 1) and is accessible to a potential user through client system 14 (shown in FIG. 1) to generate a single equivalent profile curve (not shown) for each revolved face (not shown) of a three-dimensional solid (not shown) in a two-dimensional plane (not shown). The three-dimensional solids are introduced to algorithm 82 in an electronic format that is compatible with computer aided design (CAD) type programs. Furthermore, the three-dimensional solids are primarily revolved and have cyclic symmetry about an axis of rotation (not shown). In one embodiment, the three-dimensional models include features (not shown) that are not continuously swept through 360 degrees.

In accordance with algorithm 82, no intersecting planes within the three-dimensional body being sectioned are created. Rather, in lieu of such intersections, a single equivalent profile curve for each revolved face in the two-dimensional plane is created. Initially, a user selects 100 a three-dimensional solid to be profiled and the selection is entered into client system 14. Server system 12 accesses algorithm 82 from mass storage device 18 and a loop-wise sequence is executed to query 110 the edges of the three-dimensional solid. The loop-wise sequence ensures that a contiguous path of profile curves is created and identifies a circular edge that is a revolved edge. A circular edge that is aligned with respect to the three-dimensional solid axis of rotation is considered a revolved edge. Such edges border faces and the three-dimensional solid may include any or all of five different revolved faces including: toroidal, conical, planar, cylindrical, or revolved-spline.

It is then determined 120 if such a circular edge was identified when the loopwise sequence was executed. Such a circular edge is known as a seed revolved edge and is disposed on a seed face. If a circular edge is not identified, an error is reported 122 to the user and algorithm 82 terminates 124. If a circular edge is identified, that specific circular edge is given an identifier "S" and an empty traced list is initialized 130. The traced list identifies which faces of the three-dimensional solid have been processed and traversed. As algorithm 82 is executed, the traced list is continuously populated with any faces traversed.

A radius, identified as R1, and an axial position, identified as Z1, of the curved edge S are queried 140. The curved edge S is set 150 to a current edge identifier E1 and a loop 152 is executed. The three-dimensional solid is then queried 160 to start the execution of loop 152 and to identify a revolved face adjacent current edge E1 that has not been traversed according to the set of faces stored in the traced list.

A determination 170 is made whether an additional face is found. If such a face is found, the face is queried 180 and data from the face (i.e., torus radii, cone angle, etc.) relating to one of the five types of faces, toroidal, conical, planar, cylindrical, or revolved-spline, is added 190 to the traced list. As data from the face is collected and added 190 to the traced list, an external set of edge curves for the face are identified. The external set of edge curves for the face are then cycled 200 to locate a revolved edge, identified as E2, disposed at the furthest radial, identified as R2, and axial location, identified as Z2, from edge E1. A query 210 confirms the location of the furthest radial, R2, and the axial location Z2.

A subroutine (described in more detail below) is executed to create 220 an equivalent face curve between points (R1, Z1) and (R2, Z2). The equivalent face curve is added 230 to a string of profile curves previously generated. The string of curves are bounding and will eventually define the revolved profile. The computer executing algorithm 82 is programmed to assume that every face has exactly two circular trimming edges which define the end points, i.e., a beginning and an end, of the equivalent curve, and essentially define the maximum envelope of that particular face.

After the equivalent face curve is added 230 to the string of curves, the beginning of the next curve to be generated is set 240. To set 240 the beginning of the next curve, algorithm 82 changes the beginning of the next curve to represent the end of the curve just created 220. Additionally, the current edge, E1, is also set to E2 and loop 152 is repeated to query 160 the three-dimensional solid to identify a revolved face adjacent current edge E1 that has not been traversed according to the set of faces stored in the traced list.

The computer executing algorithm 82 continues executing loop 152 until a determination 170 is reached based on the traced list that the three-dimensional solid includes no additional adjacent resolved faces. If no additional faces are found, the execution of loop 152 ceases, and a determination 300 if the created string of curves is continuous is made. If the string of curves is continuous, a two-dimensional surface is crated 310 and algorithm 82 is terminated 124. If the string of curves is determined 300 non-continuous, the curves are deleted 320 and an error is reported 330 to the user prior to algorithm 82 terminating 124.

Figure 3:
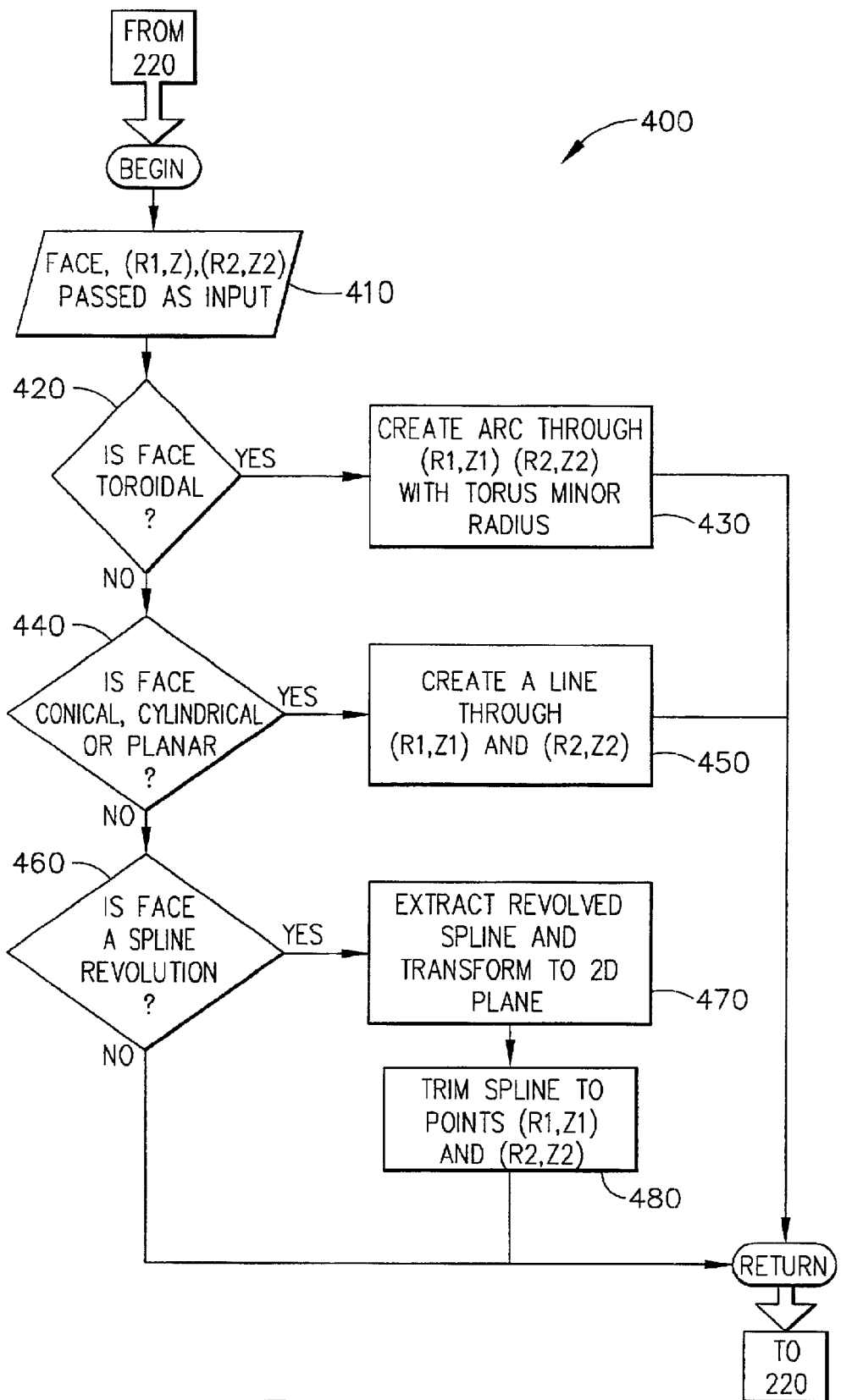
FIG. 3 is a flow chart of an equivalent face curve generator for use with the algorithm shown in FIG. 2.

FIG. 3 is a flow chart of a subroutine 400 for use with algorithm 82 (shown in FIG. 2) to create 220 (shown in FIG. 2) an equivalent face curve. When algorithm 82 is executed, a query 210 (shown in FIG. 2) confirms the location of furthest radial, R2, and the axial location Z2 with respect to edge E1. A subroutine 400 is executed to create 220 an equivalent face curve between points (R1, Z1) and (R2, Z2). After receiving 410 the points (R1, Z1) and (R2, Z2) from loop 152 (shown in FIG. 2), a subroutine 400 is executed to determine which of the five types of faces, toroidal, conical, planar, cylindrical, or revolved-spline, is defined between points points (R1, Z1) and (R2, Z2) is made. If a face is determined 420 to be toroidal, to an arc extending through points (R1, Z1) and (R2, Z2) and including a torus minor radius is created 430. The arc data is introduced to loop 152 to create 220 an equivalent face curve between points (R1, Z1) and (R2, Z2).

If the face is not determined 420 to be toroidal, subroutine 400 is executed to determine 440 if the face is conical, cylindrical, or planar. If the face is conical, cylindrical, or planar, a tine extending through points (R1, Z1) and (R2, Z2) and having a slope substantially equal to a slope of the specific face being profiled is created 450. The line data is introduced to loop 152 to create 220 an equivalent face curve between points (R1, Z1) and (R2, Z2).

If the face is not determined to be conical, cylindrical, or planar, subroutine 400 is executed to determine 460 if the face is a spline revolution. If the face is a spline revolution, algorithm 82 extracts 470 the resolved spline, and transforms the resolved spine to a two-dimensional plane. The resolved two-dimensional spline is then trimmed 480 to extend between points (R1, Z1) and (R2, Z2) and the data is introduced to loop 152 to create 220 an equivalent face curve between points (R1, Z1) and (R2, Z2).

Figure 4:
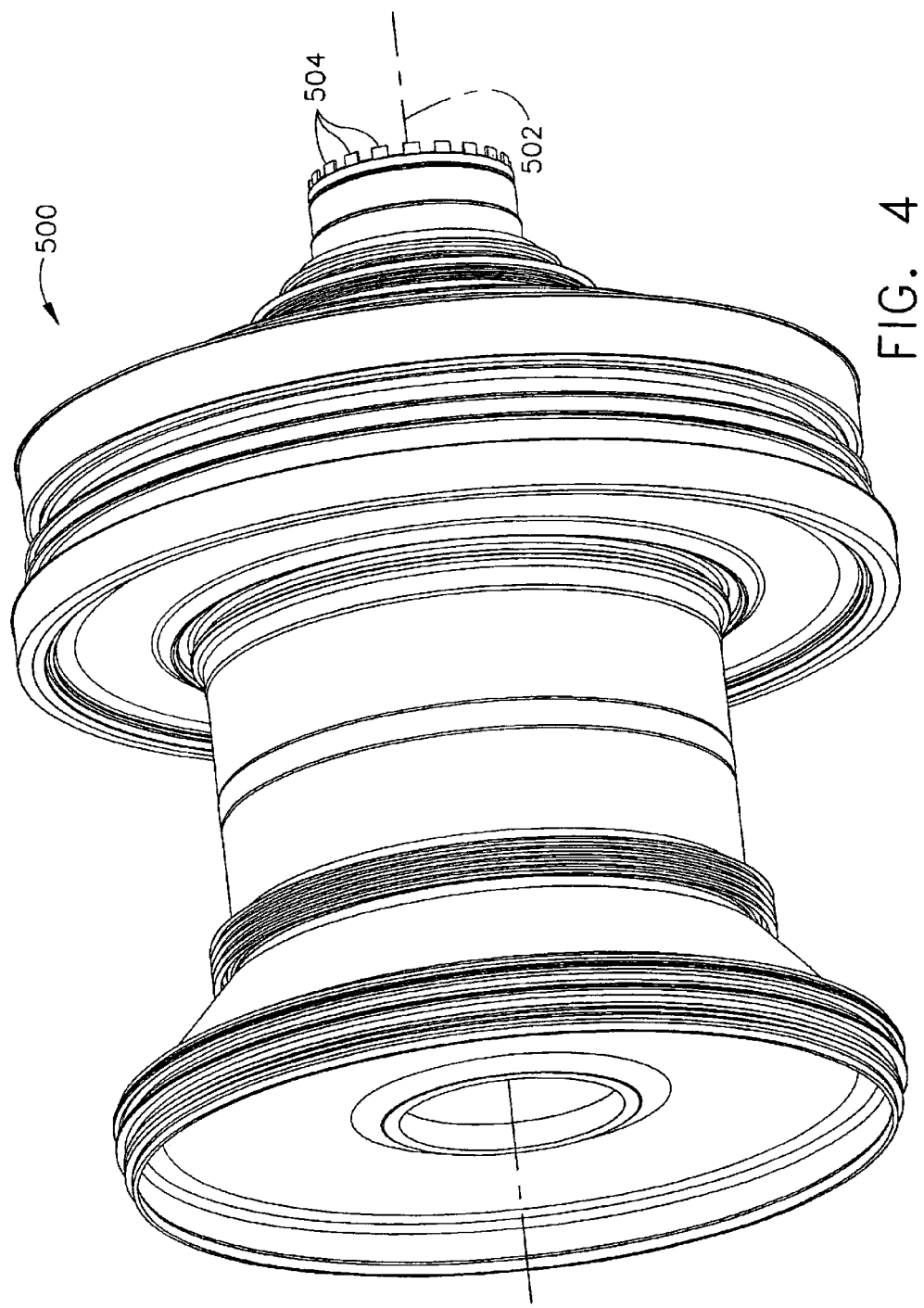
FIG. 4 is a perspective view of an exemplary three-dimensional solid that may be used to generate a single equivalent profile curve.

FIG. 4 is a perspective view of an exemplary three-dimensional solid 500 that may be used for generating a single equivalent profile curve. Three-dimensional solid 500 is introduced to algorithm 82 in an electronic format that is compatible with computer aided design (CAD) type programs. The electronic format may be input into server system 12 and stored on mass storage device 18 from an input device coupled to client system 14 and/or server system 12. In the exemplary embodiment, three-dimensional solid 500 has cyclic. By symmetry about an axis of rotation 502, about which three-dimensional solid 500 is primarily revolved. In the exemplary embodiment, three-dimensional model 500 includes a plurality of features 504 that are not continuously swept through three hundred sixty degrees.

Figure 5:
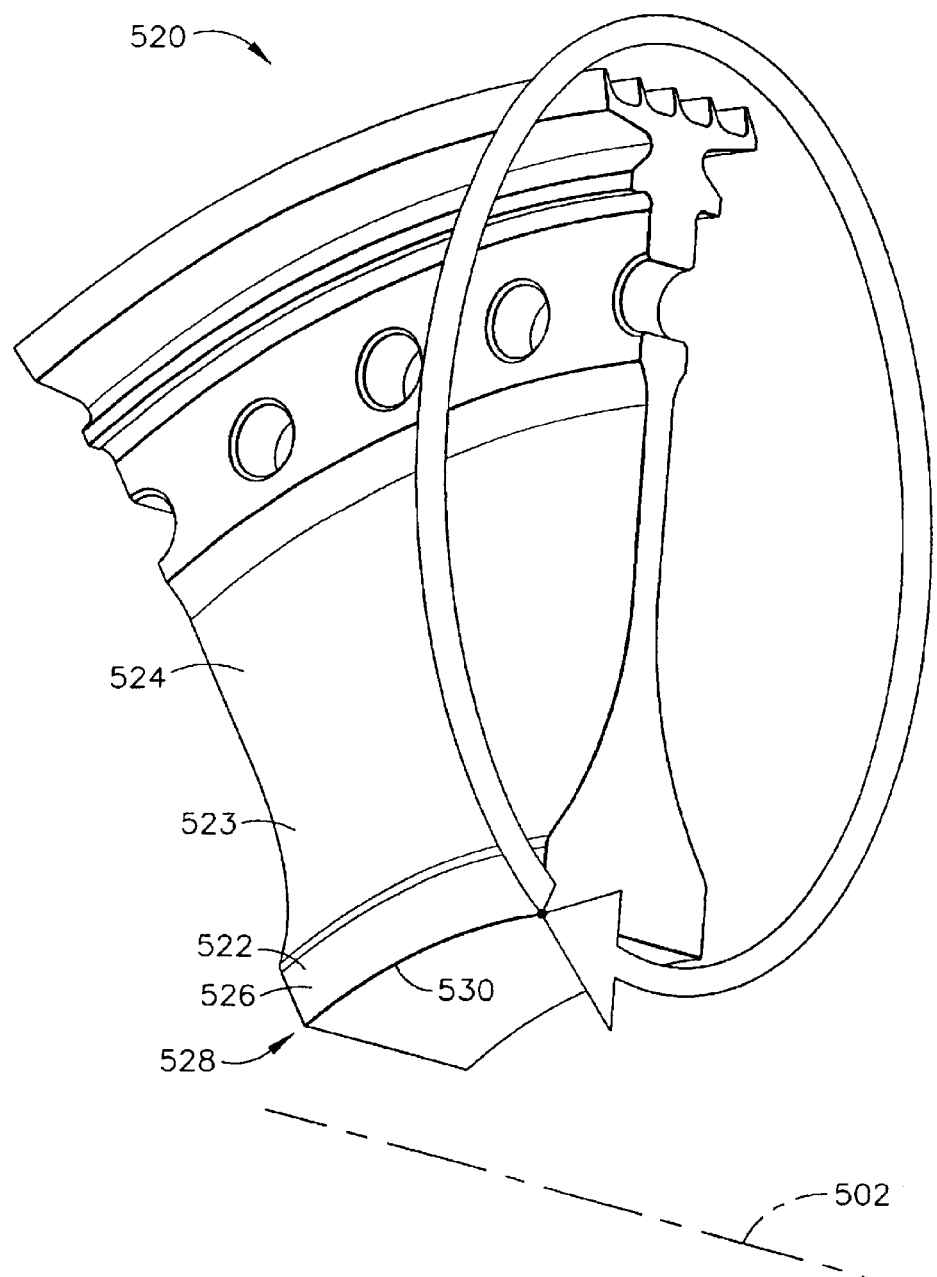
FIG. 5 is a detailed view of a portion of the exemplary three-dimensional solid shown in FIG. 4.

FIG. 5 is a detailed view of a portion 520 of the exemplary three-dimensional solid shown in FIG. 4. Profile curve generator system 10 queries three-dimensional solid 500 to identify a plurality of faces 522, 524, and 524, for example, on three-dimensional solid 500. The query of three-dimensional solid 500 begins after a revolved face is identified as a seed face 526. The query process continues until all the faces have been queried and processing returns to seed face 526. A loop-wise sequence of processing ensures that a contiguous path of profile curves is created and identifies a circular edge that is a revolved edge 528. A circular edge that is aligned with respect to three-dimensional solid axis of rotation 502 is considered a revolved edge. Such edges border faces and the three-dimensional solid may include any or all of five different revolved faces including: toroidal, conical, planar, cylindrical, or revolved-spline. Profile curve generator system 10 determines if such a circular edge was identified when the loop-wise sequence was executed. Such a circular edge is known as a seed revolved edge 530 and is disposed on seed face 526.

Figures 6, 7:
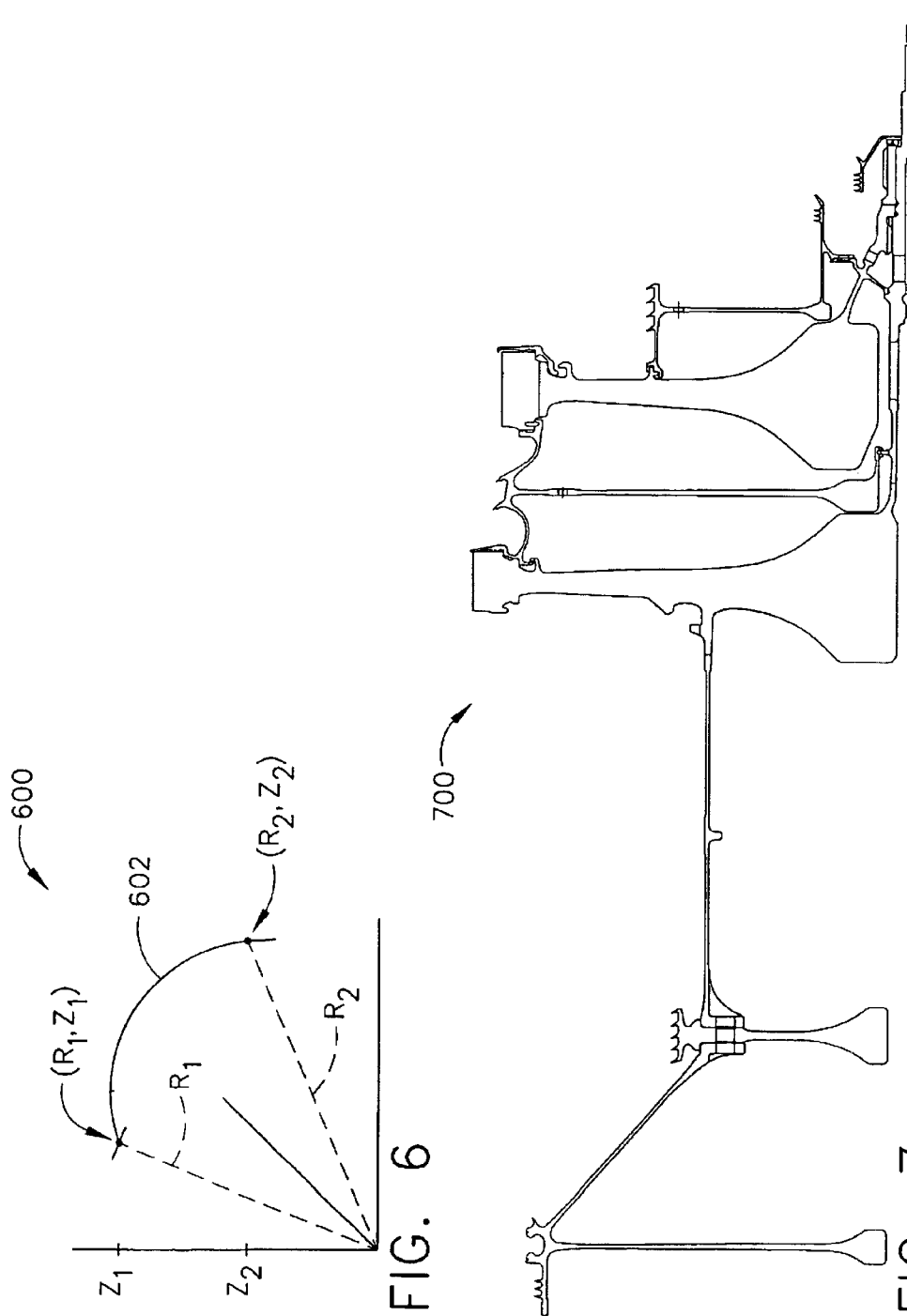
FIG. 6 is a view of a single equivalent profile curve of the exemplary three dimensional object shown in FIG. 4.
FIG. 7 is a view of a resolved cross-sectional profile of the three-dimensional solid shown in FIG. 4.

FIG. 6 is a graph illustrating an exemplary single equivalent profile curve 602 of the three-dimensional solid shown in FIG. 4. For example, subroutine 400 may create an equivalent face curve between points (R1, Z1) and (R2, Z2) and determine which of the five types of faces, toroidal, conical, planar, cylindrical, or revolved-spline, is defined between points (R1, Z1) and (R2, Z2). If a face is determined to be toroidal, single equivalent profile curve 602 will be an arc extending through points (R1, Z1) and (R2, Z2) and including a torus minor radius. If the face is not determined to be toroidal, subroutine 400 is executed to determine if the face is conical, cylindrical, or planar. If the face is conical, cylindrical, or planar, a line extending through points (R1, Z1) and (R2, Z2) and having a slope substantially equal to a slope of the specific face being profiled is created.

If the face is not determined to be conical, cylindrical, or planar, subroutine 400 is executed to determine if the face is a spline revolution. If the face is a spline revolution, algorithm 82 extracts the resolved spline, and transforms the resolved spine to a two dimensional plane. The resolved two-dimensional spline is then trimmed to extend between points (R1, Z1) and (R2, Z2).

FIG. 7 is a view of a resolved cross-sectional profile 700 of three-dimensional solid 500 shown in (FIG. 4). Resolved cross-section 700 is generated by algorithm 82 by adding the equivalent face curves to a string of profile curves previously generated. The string of curves are bounding and define the revolved profile.

Figure 8:
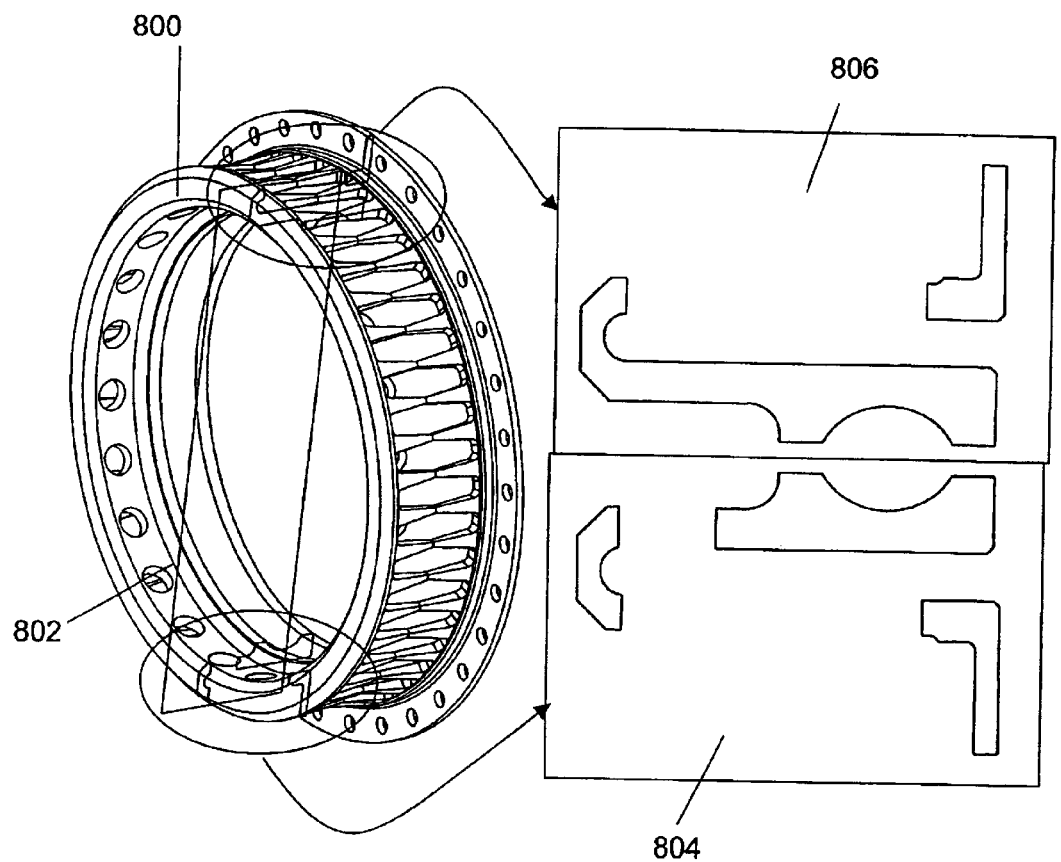
FIG. 8 is a perspective view of an exemplary three-dimensional solid that illustrates a known prior art method of profile curve generation.

FIG. 8 is a perspective view of an exemplary three-dimensional solid 800 that illustrates a known prior art method of profile curve generation. The method is known as a planar intersect method. Planar intersect uses a plane 802 to intersect solid 800 at various angles and creates a separate group of intersection curves representing each angle that the solid was intersected, such as a first group 804 and a second group 806. The different groups of intersection curves created are not a single contiguous profile of the geometry. Planar intersect may not include the full envelope of solid 800 if solid 800 is not intersected at the correct angles.

Figure 9:
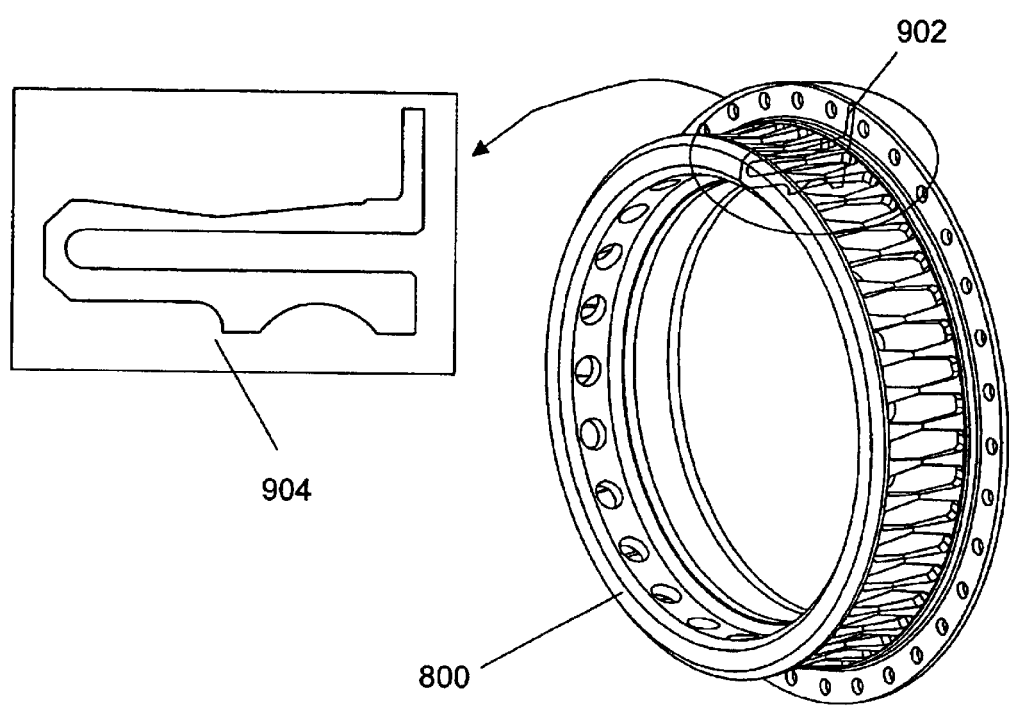
FIG. 9 is a perspective view of the three-dimensional solid shown in FIG. 8 that illustrates an exemplary two-dimensional representation generated using an embodiment of the present invention.

FIG. 9 is a perspective view of three-dimensional solid 800 (shown in FIG. 8) that illustrates an exemplary two-dimensional representation generated using an embodiment of the present invention. Solid 800 includes a plurality of revolved faces that are bounded by revolved edges, for example as illustrated in area 802. By sequencing about the solid in loopwise fashion until a starting point is reached and determining the revolved edges of each of the revolved faces, an equivalent profile curve between the edges may be determined. Combining the equivalent profile curve for each face defines a 2D representation 904 of the 3D solid.

The above-described algorithm is cost-effective and highly reliable. The computer executing the algorithm creates a single equivalent profile curve for each revolved face of a three-dimensional solid in a two-dimensional plane without extending intersecting planes through the three-dimensional body being sectioned. Additionally, a detailed and complete representation of the full envelope of the three-dimensional dimensional solid is generated. As a result, an algorithm is provided which when programmed into a computer, permits the computer to produce two-dimensional planar representations of three-dimensional solids in a cost-effective and reliable manner.

While the invention has been described in terms of various specific embodiments, those skilled in the art will recognize that the invention can be practiced with modification within the spirit and scope of the claims.

What is claimed is:

1. A method for creating a two-dimensional representation of a three-dimensional solid, said method comprising the steps of:
   (a) selecting the three-dimensional solid for which the associative two-dimensional section is to be generated;
   (b) inputting a computer aided drafting (CAD) compatible representation of the selected three-dimensional solid using an input device;
   (c) identifying a first revolved edge;
   (d) identifying a revolved face adjacent to the first revolved edge;
   (e) identifying a second revolved edge adjacent the revolved face;
   (f) determining an equivalent profile curve for the revolved face extending between the first revolved edge and the second revolved edge;
   (g) setting the first revolved edge equal to the second revolved edge;
   (h) performing steps (d) through (g) until the second revolved edge returns to the first revolved edge identified in step (c); and
   outputting the two-dimensional representation based on the determined equivalent profile curves using an output device.

2. A method in accordance with claim 1 further comprising:
   creating a trace list including each face identified and traversed while querying the three-dimensional solid; and
   querying the solid with a loop-wise sequence to generate a contiguous path of profile curves.

3. A method in accordance with claim 2 wherein the three-dimensional solid includes one of a toroidal and spherical face, said step of determining an equivalent profile curve further comprising the step of creating an arc as an equivalent profile curve.

4. A method in accordance with claim 3 wherein the three-dimensional solid includes one of a conical, planar, or cylindrical face, said step of determining an equivalent profile curve further comprising the step of creating a line as an equivalent profile curve.

5. A method in accordance with claim 4 wherein the three-dimensional solid includes a revolved-spline face, said step of determining an equivalent profile curve further comprising the step of creating a spline as an equivalent profile curve.

6. An apparatus for generating a two-dimensional representation of a three-dimensional solid, said apparatus comprising a processor programmed to:

receive a computer aided drafting (CAD) compatible representation of the selected three-dimensional solid from an input device;

generate a single equivalent profile curve for each revolved face in a two-dimensional plane using an identified first revolved edge, an identified revolved face adjacent to the first revolved edge, an identified second revolved edge adjacent the revolved face, and a determined equivalent profile for each revolved face that extends between the revolved edges adjacent each revolved face; and output the two-dimensional representation based on the determined equivalent profile to an output device.

7. An apparatus in accordance with claim 6 wherein the three-dimensional solid has cyclic symmetry, said processor further programmed to generate the two-dimensional representation without generating intersection lines within the three-dimensional solid.

8. An apparatus in accordance with claim 7 wherein said processor further programmed to follow a loop-wise sequence to create a contiguous path of profile curves.

9. An apparatus in accordance with claim 8 wherein said processor further programmed to identify a first revolved edge bordering a face and to query the three-dimensional solid from the revolved edge to each adjacent face to circumscribe the three-dimensional solid.

10. An apparatus in accordance with claim 9 wherein the three-dimensional solid includes one of a toroidal and spherical face, said processor further programmed to generate an arc.

11. An apparatus in accordance with claim 9 wherein the three-dimensional solid includes one of a conical, planar, and cylindrical face, said processor further programmed to generate a line.

12. An apparatus in accordance with claim 9 wherein the three-dimensional solid includes a revolved-spline face, said processor further programmed to generate a spline.

13. A system for creating a two-dimensional representation of a three-dimensional solid, said system comprising;

a client system comprising a browser;

a data storage device for storing information relevant to a plurality of users; and a server system configured to be coupled to said client system and said data storage device, said server system programmed to:

receive a computer aided drafting (CAD) compatible representation of the selected three-dimensional solid from an input device;

generate a single equivalent profile curve for each revolved face in a two-dimensional plane using an identified first revolved edge, an identified revolved face adjacent to the first revolved edge, an identified second revolved edge adjacent the revolved face, and a determined equivalent profile for each revolved face that extends between the revolved edges adjacent each revolved face; and output the two-dimensional representation to an output device.

14. A system in accordance with claim 13 wherein said server system further programmed to follow a loop-wise sequence to create a contiguous path of profile curves.

15. A system in accordance with claim 14 wherein said server system further programmed to create the two-dimensional representation without generating intersection lines extending through the three-dimensional solid.

16. A system in accordance with claim 15 wherein said server system further programmed to identify a first revolved edge.

17. A system in accordance with claim 16 wherein the three-dimensional solid has cyclic symmetry, said server system further programmed to query the three-dimensional solid from the identified first revolved edge through each subsequent adjacent face until returning to the original first revolved edge.

18. A system in accordance with claim 17 wherein the three-dimensional solid has one of a toroidal face and a spherical face, said server system further programmed to generate an arc.

19. A system in accordance with claim 18 wherein the three-dimensional solid has one of a conical face, a planar face, and a cylindrical face, said server system further programmed to generate a line.

* * * * *